Oct. 8, 1935.  J. B. NOWLAN  2,016,501
FRAUD PREVENTION MEANS FOR ELECTRIC METERS
Filed April 8, 1933   2 Sheets-Sheet 2
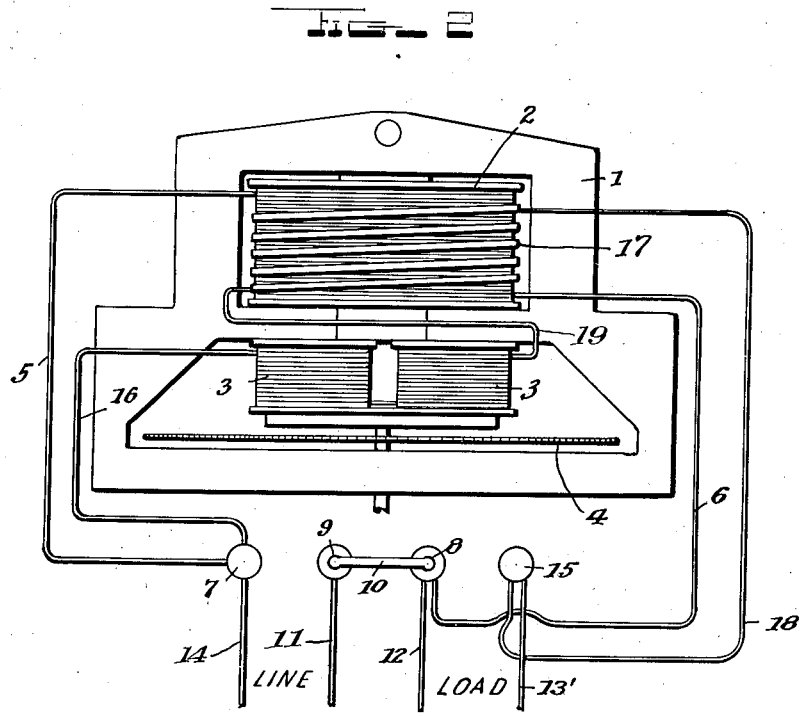
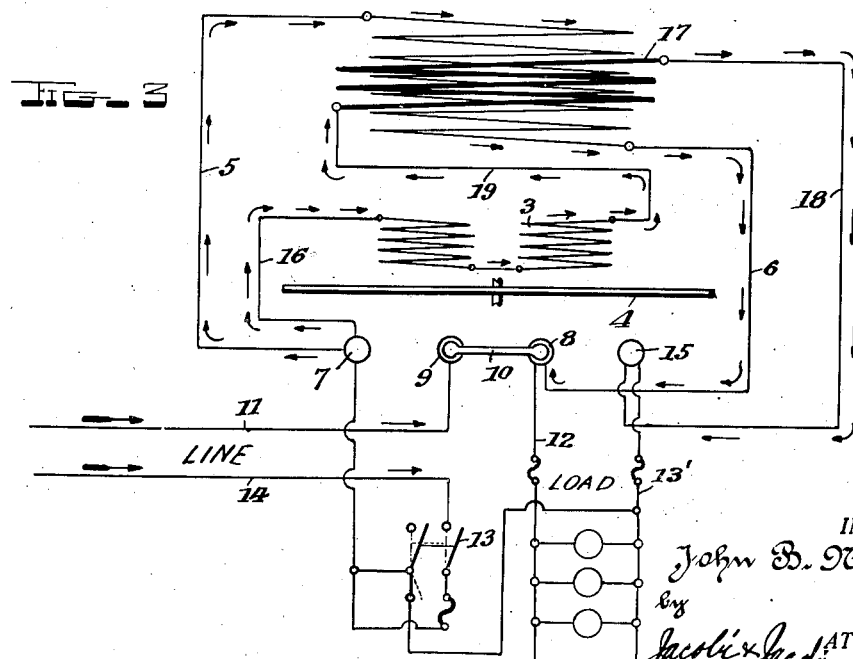
INVENTOR.
John B. Nowlan,
by
Jacobi & Jacobi ATTORNEYS.

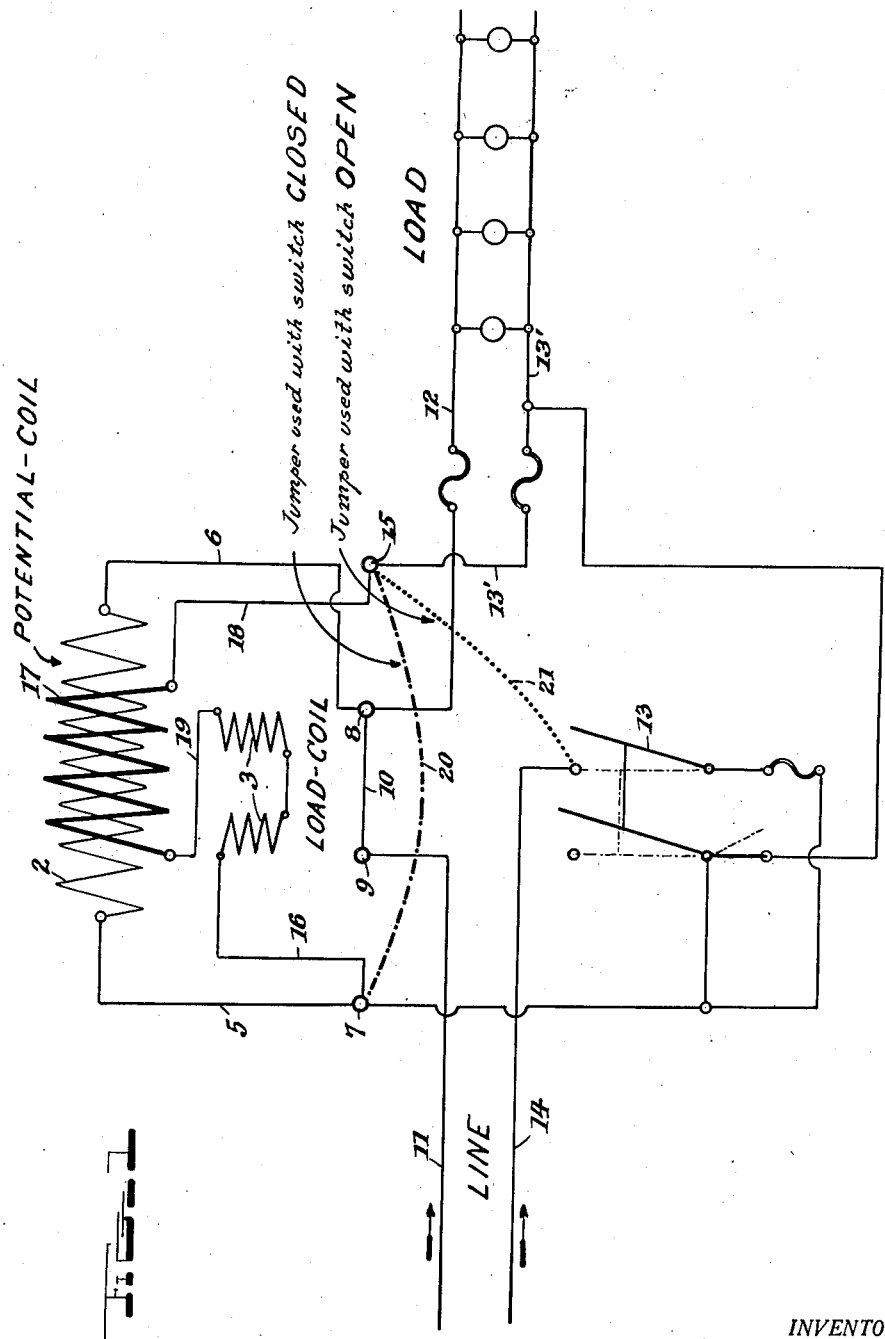

Patented Oct. 8, 1935

2,016,501

UNITED STATES PATENT OFFICE 2,016,501

FRAUD PREVENTION MEANS FOR ELECTRIC METERS

John B. Nowlan, Cincinnati, Ohio, assignor, by direct and mesne assignments, to Meter Improvement Company, a corporation of New Jersey Application April 8, 1933, Serial No. 665,217

13 Claims. (Cl. 171—34)

This invention relates to an electric meter for measuring alternating current and may be either single phase or polyphase and of any range desired.

Meters now in use will accurately register but any persons who desire to defraud an electric company furnishing the current will set in place a length of wire or the like known as a jumper. This permits current to pass from the power line to the load line without operating the meter and revenue is thus lost by the electric company. Therefore, one object of the invention is to provide in a meter a circuit arrangement which will prevent successful use of a jumper and in fact cause a meter to run full speed when a jumper is applied and thereby increase the meter reading during the time a jumper is in place instead of preventing operation of the meter.

Another object of the invention is to provide a device of this character of such construction that a meter of a conventional construction may be very easily and quickly converted into an improved theft-proof meter and in addition, make it unnecessary to materially alter existing parts of a conventional meter. This not only reduces costs as an especially constructed meter is not necessary in order to permit production of a meter of the improved construction, but also permits meters now in use to be very easily and quickly converted into a theft-proof meter and again put in use, and prevents an occupant of a house or other building from seeing that a meter of a different type has been installed.

Another object of the invention is to provide an improved meter wherein the portion which prevents successful use of a jumper will be concealed within the meter and access to the same by an unauthorized person prevented.

A still further object of the invention is to provide means for rendering a meter theft-proof which will permit current to pass through the meter without causing any rise in temperature, this being very vital to any meter equipment.

Still another object of the invention resides in providing a device which is simple and durable in construction, inexpensive to manufacture and one which will be very efficient in application to use.

With these and numerous other objects in view, my invention consists in the novel features of construction, combination and arrangement of parts as will be hereinafter referred to and more particularly pointed out in the specification and claims.

In the accompanying drawings forming a part of this application:

Figure 1 is a wiring diagram illustrating the manner in which a meter of a conventional construction may be converted into a theft-proof meter of the improved construction and also illustrating the manner in which jumpers are applied in order to prevent a meter of an ordinary construction from running;

Figure 2 is a view in elevation illustrating portions of a meter of a conventional construction with the theft-proofing attachment applied thereto; and Figure 3 is a wiring diagram for a meter of the improved construction and indicating the path of current by arrows.

In describing the invention, I shall refer to the drawings in which similar reference characters designate corresponding parts throughout the several views.

In Figure 2, there has been shown a core 1 forming a portion of a meter of a conventional construction and in this core are mounted a voltage or potential coil or winding 2 and the load coils or windings 3. There has also been shown the usual armature element or disk 4 which rotates when the meter is in operation and the speed at which this disk rotates varies according to the loads. From opposite terminals of the potential coil extend conductor wires 5 and 6 attached to terminals 7 and 8 and the terminal 8 is connected with a terminal 9 in the usual manner by a bridge 10 in order that current may pass through the line wire 11 and the load wire 12. Referring to Figure 1, there has also been provided the usual switch 13 having the customary connections with the terminal 7, second load wire 13' and the second line wire 14. The load wire 13' is attached to the usual terminal 15 and it will thus be seen that a conventional meter construction and diagram has been illustrated except that while one end of the load coil has been connected with the terminal 7 by a conductor 16, the wire which usually connects the opposite end of the load coil with the terminal 15 has been omitted. As shown, the left side of switch 13 is back connected to load wire 13', so that when switch 13 is open and line wire 14 is disconnected from terminal 7, load wire 13' is connected to terminal 7.

A meter having a conventional construction will under normal conditions accurately register the load but as previously explained, a jumper when applied will permit current to be used without the meter registering. In order to prevent this, there has been provided a load resistance coil 17 wound about the potential coil 2 and having one end connected with the terminal 15 by a conductor wire 18 and its other end connected with the load coil by a conductor 19. Therefore, this load resistance coil or winding 17 which may be referred to as an axiliary coil is in series with the load coil. The auxiliary coil may be formed of any conductive material desired but is preferably formed from a flat ribbon-like strip of metal and has a circular mil area ample to carry current through the meter without causing any rising temperature. By providing the correct number of turns about the potential coil, the disk 4 will be caused to rotate at full speed when a jumper is in place and it will be understood that the number of turns applied will be varied according to the full load of the particular meter to which it is applied.

Referring to Figure 3, it will be seen that under normal conditions, the potential coil and the load coil will be energized in the usual manner when current is used and then the disk 4 caused to rotate either very slowly or at a relatively high rate of speed according to the load applied. If a jumper is applied as shown in Fig. 1, either between the terminal 15 and the terminal 7 as indicated at 20 by dot and dash lines (Fig. 1) or across the power line as indicated by the dotted lines 21 in (Fig. 1) an endeavor to use current without use of the current being recorded upon the meter and thereby defraud the company, the endeavor will be unsuccessful as the jumper, when set in place, instead of preventing operation of the meter will serve to close the series load coils, thereby causing a closed magnetic field and causing the meter to run at full speed.

It will thus be seen that instead of a dishonest person being able to use current without the meter registering, the application of a jumper will cause the meter to run at full speed as long as the jumper or jumpers are left in place and the meter reading will be higher than it should be according to the length of time the jumper is left in place.

From the foregoing description of the construction of my improved meter, the operation thereof will be readily understood. It will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to, without departing from the spirit or sacrificing any of the principles of the invention.

Having thus described the invention, what is claimed is:

1. In a protective integrating watt meter, an armature element, supply terminals and load terminals, a set of current windings, a voltage winding, said windings being in electrical proximity to said armature element, and an auxiliary winding of relatively few turns and relatively large current carrying capacity superposed on said voltage winding in close magnetic relation therewith, said voltage winding being connected across the supply terminals, and said current windings and said auxiliary winding being connected in series between the unbridged supply terminal and the unbridged load terminal, the remaining supply terminal being bridged to the remaining load terminal, whereby the application of an external jumper between the unbridged supply terminal and the unbridged load terminal actuates said armature element.

2. In a protective integrating watt meter, an armature element, supply terminals and load terminals, a set of current windings, a voltage winding, said windings being in electrical proximity to said armature element, and an auxiliary winding of relatively few turns and relatively large current carrying capacity superposed on said voltage winding in close magnetic relation therewith, said voltage winding being connected across the supply terminals, and said current windings and said auxiliary winding being connected in series between the unbridged supply terminal and the unbridged load terminal, the remaining supply terminal being bridged to the remaining load terminal, said auxiliary winding being formed of such number of turns and so positioned that said armature element will be actuated at a speed substantially corresponding to full load of said meter when an external jumper is applied between the unbridged supply terminal and the unbridged load terminal, but said armature element is actuated at normal speeds corresponding to the actual load carried when no such jumper is applied.

3. In a protective integrating watt-meter, supply terminals and load terminals, a current winding, a voltage winding, an armature element mounted in electrical operative relation to said windings, and an auxiliary winding superposed on said voltage winding in close inductive relation therewith and connected in series with said current winding between one of said supply terminals and one of said load terminals.

4. In an electric meter having a current coil and a voltage coil; an additional coil in series with said current coil and magnetically coupled with said voltage coil, for the purpose set forth.

5. In a protective intergrating wattmeter, an armature element, supply terminals and load terminals, a current winding and a voltage winding, said windings being in electrical proximity to said armature element, and an auxiliary winding of relatively few turns and relatively large current carrying capacity superposed on said voltage winding in close magnetic relation therewith, said voltage winding being connected across the supply terminals, and said current winding and said auxiliary winding being connected in series between a supply terminal and a load terminal, the remaining supply terminal and load terminal being bridged, whereby the application of an external jumper between the first named supply terminal and load terminal actuates said armature element.

6. A wattmeter comprising a voltage winding and a plurality of current windings connected in series, said voltage winding forming a transformer with one of said current windings.

7. A wattmeter comprising registering mechanism, a voltage winding, a plurality of current windings connected in series, and means whereby said registering mechanism is actuatable by electrical energy in said voltage winding and at least one of said current windings, said voltage winding being mounted to form a transformer with one of said current windings.

8. A wattmeter comprising registering mechanism, a voltage winding, a first current winding, means whereby said registering mechanism is actuatable by electrical energy in said first current winding, and a second current winding connected in series with said first current winding and mounted in inductive relation with said voltage winding.

9. In a wattmeter, a supply lead, a load lead, a voltage winding, a group of current windings connected in series between said leads, said voltage winding being mounted in inductive relation with a part of said group of current windings, electrically drivable mechanism actuatable by electrical energy in said voltage winding and part of said group of current windings, said group of current windings and said leads constituting an incomplete local circuit completable by connecting a jumper across said leads.

10. In an integrating wattmeter, a supply lead, a load lead, a voltage winding, a group of current windings connected in series between said leads, said voltage winding being mounted in inductive relation with a first part of said group of current windings, electrically drivable recording mechanism actuatable by electrical energy in said voltage winding and a second part of said group of current windings separate from said first part thereof, said group of current windings and said leads constituting an incomplete local circuit completable by connecting a jumper across said leads.

11. In a wattmeter, a rotor armature element, a voltage winding, a first current winding mounted in electrically actuating relation with said armature element, and a second current winding connected in series with said first current winding, said voltage winding being mounted to form a transformer with said second current winding.

12. An electric meter comprising an actuating current winding, supply terminals, load terminals, an auxiliary winding connected in series with said current winding, and means connected to said supply terminals and inductively coupled to said auxiliary winding for applying an actuating voltage in series with said current winding, said means comprising a voltage winding mounted for actuating said meter.

13. In an electric wattmeter, supply terminals, load terminals, a current winding, an inductive winding, voltage leads connecting said inductive winding across said supply terminals, and current leads connecting said current winding between one supply terminal and one load terminal, a portion of one of said current leads being positioned in mutual inductive relation as a secondary for said inductive winding.

JOHN B. NOWLAN.